United States Patent
Jensen

(10) Patent No.: US 6,199,710 B1
(45) Date of Patent: Mar. 13, 2001

(54) OPTICAL DEVICE

(76) Inventor: Robert F. Jensen, 524 Ivy Point Cir., San Ramon, CA (US) 94583

( * ) Notice: Subject to any disclaimer, the term of this patent is extended or adjusted under 35 U.S.C. 154(b) by 0 days.

(21) Appl. No.: 09/365,597

(22) Filed: Jul. 30, 1999

(51) Int. Cl.[7] .................................................. B65D 41/04
(52) U.S. Cl. ........................ 215/228; 220/212; 359/802
(58) Field of Search ...................... 215/228, 329, 215/230; 220/212, 288, 377; 206/216, 316.1, 316.3; 359/413, 802, 803

(56) References Cited

U.S. PATENT DOCUMENTS

| | | | |
|---|---|---|---|
| 287,978 | * 11/1883 | Tetlow | 359/802 |
| 2,961,108 | * 11/1960 | Johnson | 215/228 |
| 3,397,935 | * 8/1968 | Natsume | 359/802 |
| 4,770,519 | * 9/1988 | Jacques | 359/802 |
| 4,784,258 | * 11/1988 | Figari | 206/316.1 |
| 5,760,975 | * 6/1998 | DiGiovanni | 359/802 |
| 5,936,765 | * 8/1999 | Walsh | 359/413 X |

* cited by examiner

Primary Examiner—Nathan J. Newhouse
(74) Attorney, Agent, or Firm—Theodore J. Bielen, Jr.

(57) ABSTRACT

A material containing optical device utilizing a housing having a bottom, and a side. The side sealingly engages the bottom and extends outwardly from the same to form an open chamber. The open chamber terminates in a mouth with an entrance. A cap extends transversely relative to the mouth of the chamber to close the entrance. A first optical elements located in the bottom of the housing and permits light to travel into the chamber. A second optical element is located in a removable cap. The first and second optical elements are lined to adjust the visual angle of an object viewed through the chamber.

4 Claims, 2 Drawing Sheets

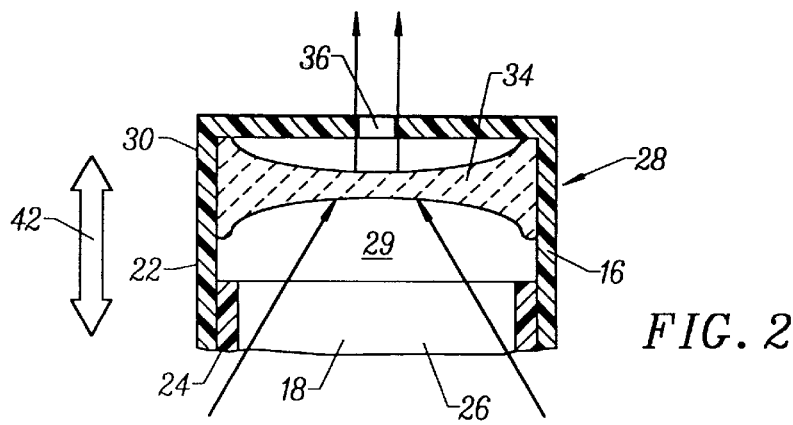
FIG. 2
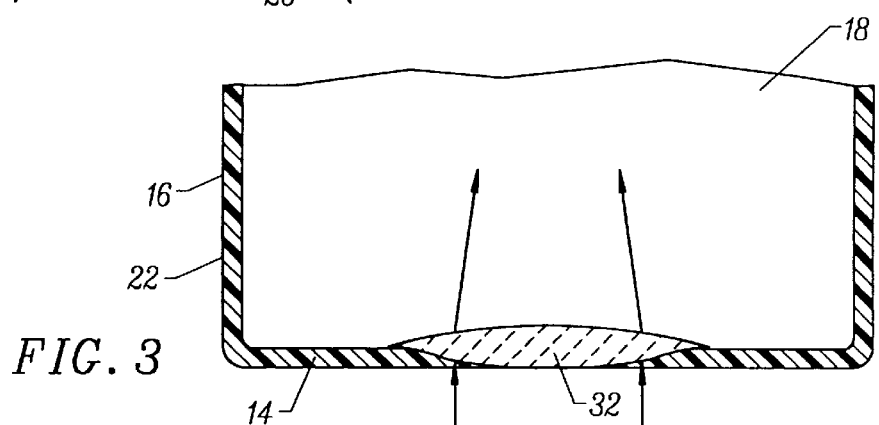
FIG. 3
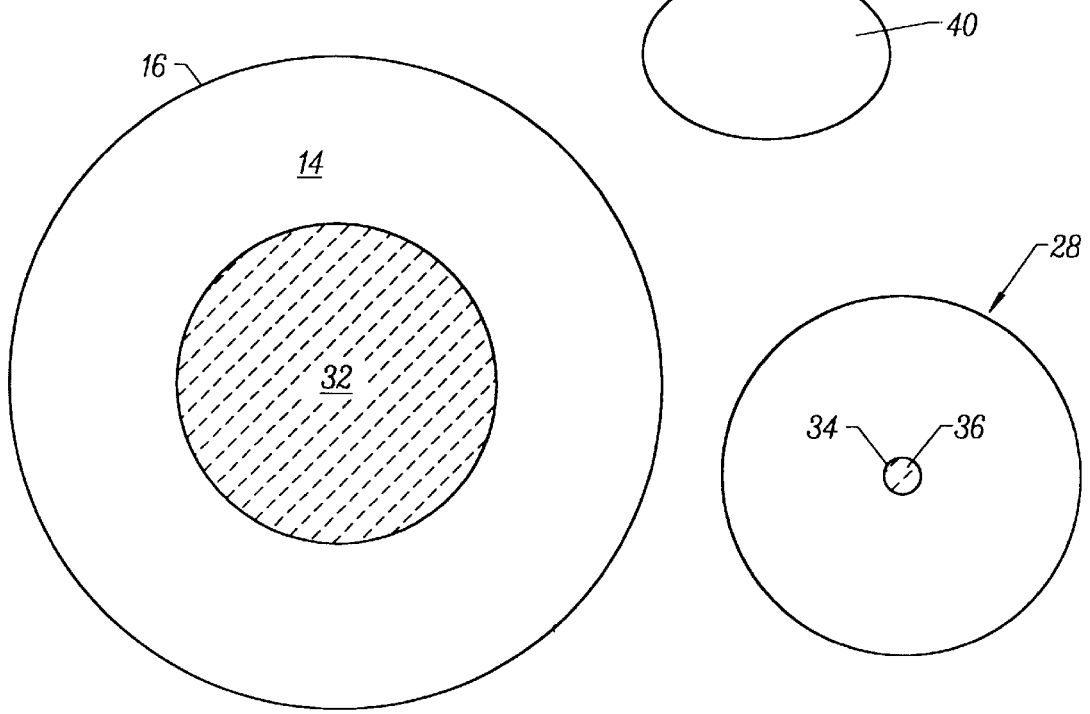
FIG. 5
FIG. 4

OPTICAL DEVICE

BACKGROUND OF THE INVENTION

The present invention relates to a novel and useful liquid containing optical device.

Containers holding material such as liquids, are typically used at entertainment events such as sports arenas, music concerts, political gatherings, and like activities. Due to large number of persons attending such events, it is often necessary to carry a pair of binoculars, or a telescope to see the subjects providing such entertainment or persons conducting the activity. It is also common to consume food and drink at such activities. The latter is often contained or carried in a bottle, which is typically molded from plastic material such as polystyrene, polypropylene, and the like. When the contents of the bottle have been consumed, the bottle is often discarded creating a burden in the collection and disposal of the same.

An optical device which possess liquid carrying capabilities would be a notable advance in the field of useful articles.

BRIEF SUMMARY OF THE INVENTION

In accordance with the present invention a novel and useful liquid containing optical device is herein provided.

The device of the present invention utilizes a housing having a bottom, and a side which sealingly engages the bottom. The side extends outwardly from the bottom and forms an open chamber. An exterior portion lies opposite the chamber on the housing outer surface. The side terminates in a mouth forming an entrance to an inner chamber. The chamber is capable of holding a material such as a liquid, solid, or gas, for use by the bearer of the optical device.

A cap is also found in the present invention and extends transversely relative to the mouth of the housing open chamber. The cap is capable of closing the chamber to prevent liquid from egressing from the open chamber through the mouth of the housing. The cap is removably held to the side of the housing to permit the user to gain access to the liquid in the open chamber.

In addition to the liquid containing capabilities of the optical device of the present invention, the device may be employed to adjust a visual angle of an object adjacent to the housing. That is to say, the material containing optical device may be formed into a telescope, microscope, and the like. In this regard, a first optical element is located in the bottom of the housing. Where a Galilean telescope is being formed, the first optical element may be an objective lens of the double convex type. The first optical element may be imbedded in the bottom of the housing or molded contiguously during the formation of the housing. In such a case, the housing may be tinted or rendered opaque, leaving the first optical element in the bottom with a clear disposition.

The second optical element is located in the cap. Again, second optical element may take the form of an ocular lens of the double concave or divergent type. Of course, other configurations may be used with the objective and ocular elements found in the bottom and cap, respectively to form other types of telescopes, microscopes or the like. Further, the second optical elements may be imbedded or molded into place in the same manner as the first optical element, hereinabove described. The first and second optical elements would be aligned to allow a user to peer through the first and second optical elements and observe an object adjacent the housing in a magnified state i.e. with an adjusted visual angle.

It should be noted that the cap may have a threaded portion which threadingly engages the threaded portion of the housing at the mouth region. In this manner, the cap possessing the second optical element is adjustable in distance relative to the first optical element in the bottom of the housing. Such adjustment serves as a focus for the optical device of the present invention.

It may be apparent that a novel and useful optical device has been herein above described.

It is therefore an object of the present invention to provide a liquid containing optical device that serves as a container of liquid and as a telescope or microscope when the liquid is removed from the container.

Another object of the present invention is to provide a liquid containing optical device which obviates the need to carry a pair of binoculars, telescope, and the like to an entertainment event.

Another object of the present invention is to provide a liquid containing optical device which prevents the need to dispose of liquid containers formed in a conventional manner.

A further object of the present invention is to provide a liquid containing optical device which is easily transported and concealed for use in either mode.

The invention possesses other objects and advantages especially as concerns particular characteristics and features thereof which will become apparent as the specification continues.

BRIEF DESCRIPTION OF THE SEVERAL VIEWS OF THE DRAWING

FIG. 2 is a sectional view taken along line 2—2 of FIG. 1.

FIG. 3 is a sectional view taken along line 3—3 of FIG. 1.

FIG. 4 is a top plan view of the device depicted in FIG. 1.

FIG. 5 is a bottom plan view of the device depicted in FIG. 1.

Figure 1:
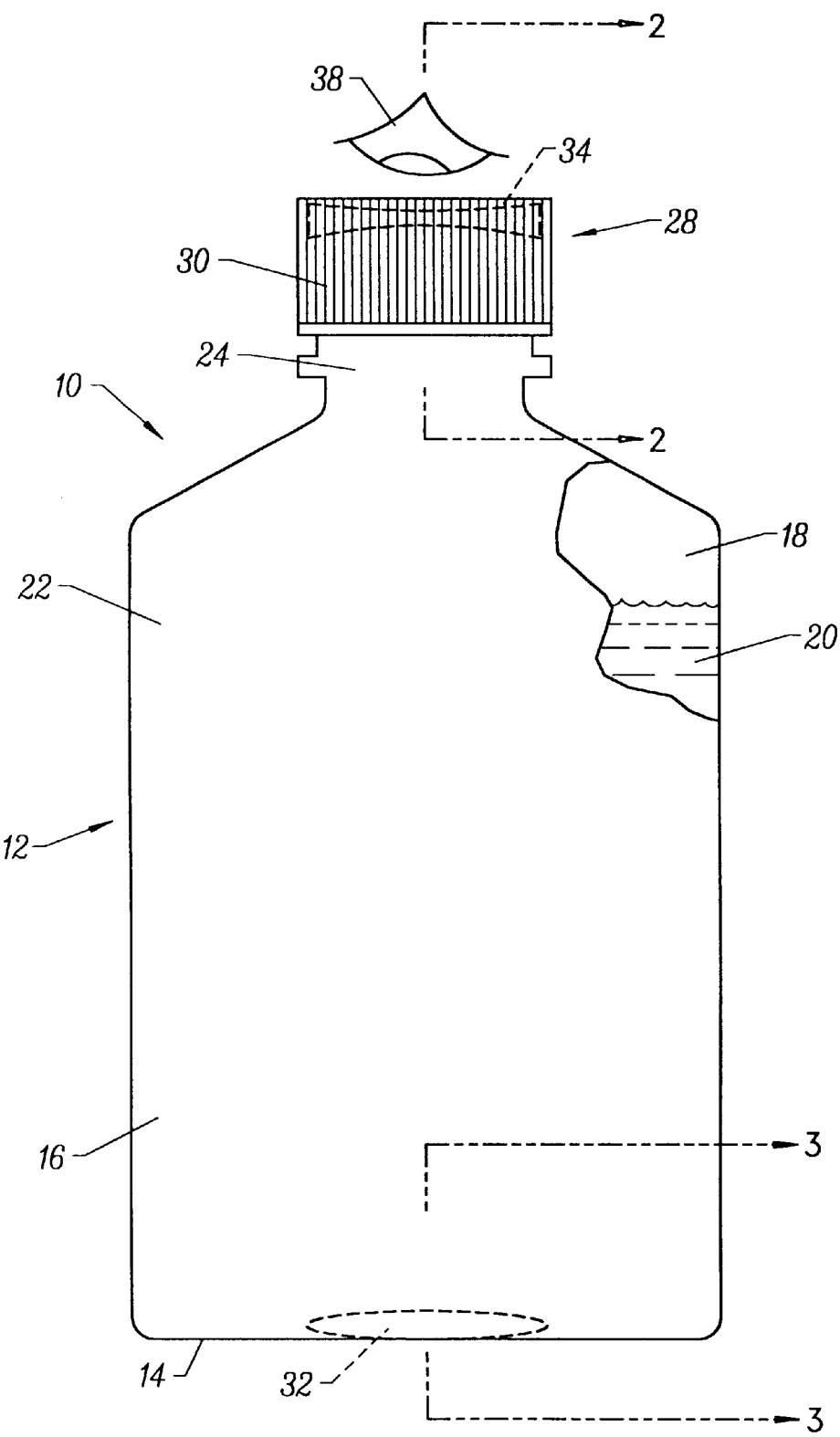
FIG. 1 is a side elevational view of the optical device of the present invention with a broken away portion depicting the liquid carrying mode.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior delineated drawings.

The invention as a whole is depicted in the drawings be reference character 10. The optical device 10 includes as one of its elements a housing 12 having a bottom 14 and a side 16 which is contiguous with bottom 14 or sealingly engages bottom 14. Preferably, housing 12 would be molded into one piece using ceramic, glass, plastic or other suitable material. Side 16 extends outwardly from bottom 14 to form an open chamber 18 which is capable of containing body of liquid 20. Chamber 18 lies adjacent exterior 22 of housing 12 and may generally take the form of a cylinder, a rectangular solid, a faceted three-dimensional body, and the like. Side 16 terminates in a mouth 24, which forms an entrance 26 to chamber 18.

A cap 28 is also depicted in the device 10 of the present invention. Cap 28 forms a chamber 29. Cap 28 may have a knurled exterior 30 and would extend transversely relative to mouth 24 of housing 12 to close entrance 26 to chamber 18. Cap 28 is removably held to side 16, specifically mouth portion 24 thereof, by friction, pressure fitting, threading, and other like conventional structures. As depicted in FIG. 2, cap 18 is shown as being friction fitted to mouth 24.

Turning to FIG. 1, and with further reference to FIG. 3, it may be seen that a first optical element 32 is located in bottom 14 of housing 12. Optical element 32 permits light to travel from exterior 22 of housing 12, into chamber 18, and through mouth entrance 26 to chamber 18. Such light passage generally occurs when liquid body 20 has been emptied from chamber 18. First optical element 32, in the embodiment depicted in the drawings, may be deemed an objective lens ("objective"). Objective lens 32 may take the form of a plano convex or a double convex lens, in the embodiment shown. First optical element 32 may be fastened at bottom 14, imbedded to the same, or molded into housing 12 during the manufacturing process.

A second optical element 34 is located in cap 28. Second optical element 34 may be described as an ocular (eye piece). is Ocular 34 may be a single or double concave lens in the embodiment shown. Thus, device 10 may be employed as a Galilean telescope. Again, second optical element 34 may be positioned through the same process described with respect to first optical element 32.

Opening 36 permits the viewer to place a user's eye 38 adjacent cap 28 as is depicted in FIG. 1. Thus, light emanating from the exterior of housing 12, through bottom first optical element 32, chamber 18, and second optical element 34 would be detected by eye 38. In other words, first and second optical elements 32 and 34, respectively, are aligned to adjust the visual angle of any object, such as object 40, FIG. 3, when viewed through first and second optical elements 32 and 34.

In operation, device 10 is assembled using housing 12 and cap 28 to hold body of liquid 20 within chamber is thereof. After liquid body 20 is preferably removed, cap 28 is again placed on mouth 24 of housing 12. Cap 24 would be adjustable according to directional arrow 42, FIG. 2, in order to focus the optical device a Galilean telescope in the present embodiment and magnify or increase the power of object 40 viewed by eye 38.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A material containing optical device, comprising:

a. a housing having a bottom, a side sealingly engaging said bottom and extending outwardly therefrom, said bottom and side forming a liquid containing open chamber and an opposite exterior, said side terminating in a mouth forming an entrance to said chamber;

b. a cap extending transversely relative to said mouth to close said entrance to said chamber, said cap being removably held to said side of said housing said cap possessing a chamber;

c. a first optical element located in said bottom of said housing to permit light to travel from said exterior to said open chamber;

d. a second optical element located within said cap chamber, said chamber possessing an opening communicating with said second optical element within said chamber, said first and second optical elements being aligned to adjust the visual angle of an object adjacent said housing when viewed through said first and second optical elements; and e. means for focusing said first and second optical elements comprising means for moving said cap relative to said first optical element, said means for moving said cap relative to said first optical element comprising said housing mouth including a threaded portion and said cap including a threaded portion threadingly engaging said threaded portion of said housing.

2. The device of claim 1 in which bottom and side are formed from a contiguous wall, said first optical element being embedded in said wall to permit transmission of light from said exterior of said housing into said chamber and through said second optical element to said exterior of said housing.

3. The device of claim 1 in which said first optical element is embedded in said bottom.

4. The device of claim 1 in which bottom and side are formed from a contiguous wall, said first optical element being embedded in said wall to permit transmission of light from said exterior of said housing into said chamber and through said second optical element to said exterior of said housing.

* * * * *